US008683452B1

(12) United States Patent
Hodgman et al.

(10) Patent No.: US 8,683,452 B1
(45) Date of Patent: Mar. 25, 2014

(54) DYNAMICALLY OBFUSCATED JAVASCRIPT (75) Inventors: Roy Hodgman, Wenham, MA (US); Ofer Mizrach, Tel Aviv (IL); Ofri Mann, Hamaapil (IL); Alex Vaystikh, Hod Hasharon (IL)

(73) Assignee: EMC Corporation, Hopkinton, MA (US)

( * ) Notice: Subject to any disclaimer, the term of this patent is extended or adjusted under 35 U.S.C. 154(b) by 592 days.

(21) Appl. No.: 12/974,756

(22) Filed: Dec. 21, 2010

(51) Int. Cl.
G06F 9/44 (2006.01)
G06F 9/45 (2006.01)
G06F 12/14 (2006.01)

(52) U.S. Cl.
USPC ........... 717/136; 717/115; 717/126; 717/139; 713/190; 726/26

(58) Field of Classification Search
None
See application file for complete search history.

(56) References Cited

U.S. PATENT DOCUMENTS

| 6,463,538 | B1* | 10/2002 | Elteto | 713/190 |
| 7,506,177 | B2 | 3/2009 | Chow et al. | |
| 7,620,987 | B2 | 11/2009 | Shelest et al. | |
| 7,774,831 | B2* | 8/2010 | Kuznetsov et al. | 726/12 |
| 7,779,394 | B2* | 8/2010 | Homing et al. | 717/136 |
| 8,020,152 | B2* | 9/2011 | Wadsworth et al. | 717/126 |
| 2004/0103404 | A1* | 5/2004 | Naumovich et al. | 717/136 |
| 2004/0236957 | A1* | 11/2004 | Durand et al. | 713/193 |
| 2006/0005250 | A1* | 1/2006 | Chu et al. | 726/26 |
| 2006/0225036 | A1* | 10/2006 | Pandit et al. | 717/115 |
| 2006/0265689 | A1* | 11/2006 | Kuznetsov et al. | 717/117 |
| 2007/0169023 | A1* | 7/2007 | Bera | 717/136 |
| 2007/0240222 | A1* | 10/2007 | Tuvell et al. | 726/24 |
| 2009/0119515 | A1* | 5/2009 | Nicolson et al. | 713/190 |
| 2010/0180346 | A1* | 7/2010 | Nicolson et al. | 726/26 |
| 2010/0313188 | A1* | 12/2010 | Asipov et al. | 717/139 |
| 2012/0116896 | A1* | 5/2012 | Holloway et al. | 705/14.73 |

OTHER PUBLICATIONS

Making a hack proof game in Javascript, Stackoverflow, Jul. 2, 2010, 6 pages, [retrieved on Jun. 23, 2013], Retrieved from the Internet:<URL:http://stackoverflow.com/questions/3168527/making-a-hack-proof-game-in-javascript/3168735#3168735.*
Mishra, P., Taxonomy of Uniqueness Transformations, Department of Computer Science, San Jose State University, Dec. 2003, 110 pages, [retrieved on Jun. 24, 2013], Retrieved from the Internet: <URL:http://www.cs.sjsu.edu/faculty/stamp/students/FinalReport.doc>.*

(Continued)

Primary Examiner — Thuy Dao
Assistant Examiner — Geoffrey St Leger
(74) Attorney, Agent, or Firm — BainwoodHuang (57) ABSTRACT

An improved technique of providing computer code to a set of client computers is disclosed. In the improved technique, a set of files is generated, each file in the set of files including computer code configured to be read by an interpreter on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreter on each client computer.

18 Claims, 7 Drawing Sheets

(56) References Cited

OTHER PUBLICATIONS

Method for a JavaScript Obfuscator, IBM Technical Disclosure Bulletin, Feb. 1, 2002, 4 pages, [retrieved on Jun. 20, 2013], Retrieved from the Internet: <URL: http://ip.com/IPCOM/000015608>.*

Van Gundy, M., Towards a More Trustworthy Online Experience, Department of Computer Science, University of California, Davis, May 25, 2010, 62 pages, [retrieved on Jun. 20, 2013], Retrieved from the Internet: <URL:http://matt.singlethink.net/pubs/mdvangundy-proposal.pdf>.*

Jiang, X., et al., RandSys: Thwarting Code Injection Attacks with System Service Interface Randomization, CERIAS Tech Report 2005-78, 2007, 21 pages, [retrieved on Jun. 20, 2013], Retrieved from the Internet: <URL: http://citeseerx.ist.psu.edu/viewdoc/summary?doi=10.1.1.158.9905>.*

\* cited by examiner

```
function lookForTrojans()
{
    evidence = array();
    collectEvidence( evidence, "A", "trojanIndicatorA" );
    collectEvidence( evidence, "B", "trojanIndicatorB" );
    sendEvidence( evidence );
} function collectEvidence( Array evidence, String key, String evidenceName )
{
    evidence[key] = getSetting( evidenceName );
} function sendEvidence( Array evidence )
{
    send( evidence );
}
```

```
function lookForTrojans()
{
    evidence = array();
    notEvidence = array();
    collectEvidence1( evidence, "A", "trojanIndicatorA" );
    collectEvidence2( evidence, "B", "trojanIndicatorB" );
    sendEvidence( evidence );
    doNothing1( notEvidence, "C", "trojanIndicatorC" );
    doNothing2( notEvidence, "D", "trojanIndicatorD" );
    lookLikeYoureGoingToSendDataButDont( notEvidence );
} function collectEvidence1( Array evidence, String key, String evidenceName )
{
    evidence[key] = getSetting( evidenceName );
} function collectEvidence2( Array evidence, String key, String evidenceName )
{
    evidence[key] = getSetting( evidenceName );
} function sendEvidence( Array evidence )
{
    send( evidence );
} function doNothing1( Array evidence, String key, String evidenceName )
{
    noOp();
} function doNothing2( Array evidence, String key, String evidenceName )
{
    noOp();
} function lookLikeYoureGoingToSendDataButDont( Array evidence )
{
    noOp( evidence );
}
```

```
function lookForTrojans() {
    aa1 = array();
    aa2 = array();
    aaa( aa1, "A", "trojanIndicatorA" );
    aab( aa1, "B", "trojanIndicatorB" );
    aac( evidence );
    aad( aa2, "C", "trojanIndicatorC");
    aae( aa2, "D", "trojanIndicatorD");
    aaf( aa2 );
}
function aaa( Array a, String b, String c ){ a[b] = getSetting( c ); }
function aab( Array a, String b, String c ){ a[b] = getSetting( c ); }
function aac( Array a ){ send( a ); }
function aad( Array a, String b, String c ){ a[b] = noOp(); }
function aae( Array a, String b, String c ){ a[b] = noOp(); }
function aaf( Array a ){ noOp( a ); }
```

```
function lookForTrojans() {
    bb1 = array();
    bb2 = array();
    bba( bb1, "A", "trojanIndicatorA" );
    bbb( bb1, "B", "trojanIndicatorB" );
    bbc( evidence );
    bbd( bb2, "C", "trojanIndicatorC" );
    bbe( bb2, "D", "trojanIndicatorD" );
    bbf( bb2 );
} function bba( Array a, String b, String c ){ a[b] = getSetting( c ); }
function bbb( Array a, String b, String c ){ a[b] = getSetting( c ); }
function bbc( Array a ){ send( a ); }
function bbd( Array a, String b, String c ){ a[b] = noOp(); }
function bbe( Array a, String b, String c ){ a[b] = noOp(); }
function bbf( Array a ){ noOp( a ); }
```

DYNAMICALLY OBFUSCATED JAVASCRIPT

BACKGROUND

The use of electronic transactions over public networks such as the Internet has greatly increased over the past decade. Each electronic transaction taking place over the Internet runs the risk of exposing personally identifiable information (PII) to unwanted third parties.

Conventional systems for carrying out electronic transactions over the Internet use software embedded within a browser and running on a script written in a scripting language for which the browser has an interpreter. The scripting language interpreter in modern browsers is typically a Javascript interpreter.

An example of software for conducting electronic transactions which runs in a browser is a banking application from which a user on a computer wishes to transfer funds from one account to another within a banking institution. Besides allowing for the user to enter PII such as account numbers and identifying information such as passwords, the software may also collect several data elements on the user's computer, the data elements indicating, for example, a Trojan infection which could compromise the user's PII.

SUMMARY

Systems engaging in electronic transactions over the Internet are frequently subjected to attacks from rogue processes which attempt to interfere with the operation of scripts on which software platforms for performing the electronic transactions are built. Such rogue processes can interfere with such electronic transactions by modifying a script either to prevent the script from running at all or to modify how the script executes. Specifically, a rogue process running on an unsuspecting client computer can detect Javascript files and perform modifications to a script written in Javascript based upon, for example, a pattern of usage of function names within the script. Modern programming techniques which stress programming clarity within scripts facilitate such modifications.

One solution to this problem posed by such rogue processes is through a script obfuscator. That is, by sidestepping the common practice of using easily recognized function and variable names, scripts can be written which have desired functionality and make it difficult for rogue processes to modify. For example, if an attacker knows to prevent function getUserData( ) from executing in plain Javascript, the attacker may have a more difficult time preventing a function aaa1aaaa( ), which has the same functionality as getUserData( ) from executing.

Unfortunately, conventional script obfuscators operate on scripts only once. In such a case, if a rogue process such as a malware script can prevent a function such as getUserData( ) from executing, then a little work can reveal the obfuscated version of this function. With this knowledge, the rogue process can prevent the function aaa1aaaa( ) [formerly getUserData( )] from executing in the obfuscated script.

Furthermore, conventional script obfuscators do not fundamentally alter the control flow and/or the structure of the code in the script more than once. In such a case, a smart malware script may be able to deduce the functionality of an obfuscated script from, e.g., collecting data on how the script is executed in the browser.

In contrast to the above-described conventional transaction infrastructures in which parts of a web page (e.g., a security function) are susceptible to malicious tampering by a rogue process (e.g., prevention of execution, modification of operation, etc.), an improved technique repeatedly delivers, upon request from a client computer, a web page to the client computer with differently obfuscated scripts for each web page request from the client computer. That is, each web page remains intact and able to be processed by a web browser, but certain standard operation names (e.g., function calls, routine names, terms, etc.) within the script are replaced with meaningless names or names which are difficult for an automated process to decipher in real time. Such replacement can occur over and over again for the same client computer and/or across different client computers, with different function name replacements on each replacement. Moreover, some web pages may include dummy procedure calls which misdirect a potential attacker to improve the chances of running the script at least once in the event that a rogue process has successfully tampered with the script. Such a technique makes the web pages less likely to succumb to malware while not sacrificing normal operation.

For example, if getUserData( ) within a script is converted to aaa1aaaa( ) in one instance of obfuscated code, then in a second instance the script may be converted into asdfgasdf( ). By changing the names of the functions representing the instructions generated by getUserdata( ) at each request for the script, the server is able to lower the risk of a rogue process (e.g., a malware script) on a client computer interfering with the instructions generated by the getUserData( ) function. By reducing the likelihood of a rogue process interfering with such instructions, the security of electronic transactions between the client computer and the server is enhanced.

As an example of including dummy procedure calls, new function and variable names may be inserted into the script without changing the functionality of the script. An instance of such a function would be a function doNothing( ) which when called performs no operations and returns no result. A first initialization of the improved obfuscation technique would convert the name doNothing( ) to, say, bbb1bbbb( ) while a second initialization would convert doNothing( ) to 34sksksks1112( ). In this case, within each initialization, calls to obfuscated versions of doNothing( ) can alter the structure of the code, further lowering the risk of an automated process from collecting consistent data on mapping a function name to an operation.

It should be understood that in most circumstances, electronic transactions take place between an institution [e.g., a bank] and its many clients in real time. The improved technique can be constructed and arranged to manage various obfuscated scripts in order to ensure that no automated process can establish a pattern of operation from any script. Further, the script can include methods by which rogue processes are detected on a given client computer and obfuscations adjusted if necessary to ensure the rogue processes cannot impede the function of the script.

In some arrangements, there may be many client computers connected to an institutional server over the Internet. For each request to access the script from a client computer, a newly obfuscated version is sent in a round robin fashion to the client computer from the institutional server. Each obfuscated version can be generated from a given set of function names and variable names. Alternatively, different obfuscated versions can be generated from different pools of function names and variable names.

In other arrangements, the obfuscation is performed on an intermediary server which is in communication with the institutional server, the intermediary server acting to generate the obfuscated versions of the script from the original script. The institutional server can request a certain amount of obfuscated versions of the script from the intermediary server which the institutional server can distribute to its clients, the requests taking place periodically at a certain time interval. Further, the intermediary server can generate obfuscated versions from a set of tokens generated by a seed value stored on the intermediary server.

One embodiment of the improved technique is directed to a computer-implemented method of providing computer code (e.g., in a script) to a set of client computers, each client computer in the set of client computers having an interpreter capable of producing a set of computer instructions from the computer code. The method includes generating, by a server connected to each client computer over a network, a set of files, each file in the set of files including computer code configured to be read by the interpreter on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreter on each client computer. The method also includes receiving, from a first client computer in the set of client computers over the network, a first request to access the computer code in the first file and sending the first file to the first client computer over the network upon receiving the first request. The method further includes receiving, from a second client computer in the set of client computers over the network, a second request to access the computer code in the second file and sending the second file to the second client computer over the network upon receiving the second request.

Additionally, some embodiments of the improved technique are directed to a system for providing computer code to a set of client computers, each client computer in the set of client computers having an interpreter capable of producing a set of computer instructions from the computer code, the system comprising a server. The server includes a network interface coupled to a network, a memory and a processor coupled to the memory, the processor configured to carry the method of providing computer code to a set of client computers.

Furthermore, some embodiments of the improved technique are directed to a computer program product having a non-transitory computer readable storage medium which stores a server code to provide computer code to a set of client computers, each client computer in the set of client computers having an interpreter capable of producing a set of computer instructions from the computer code, the server code including a set of server instructions to carry the method of providing computer code to a set of client computers.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of providing computer code to a set of client computers repeatedly delivers, upon request from a client computer, a web page to the client computer with differently obfuscated scripts for each web page request from the client computer. That is, each web page remains intact (i.e., complete in the sense it is fully operational) and able to be processed by a web browser, but certain standard operation names (e.g., function calls, routine names, terms, etc.) within the script delivered with or referenced by that web page are replaced with meaningless names or names which are difficult for an attacker to decipher. Such replacement can occur over and over again for the same client computer and/or across different client computers, with different function name replacements on each replacement. Moreover, some web pages may include dummy procedure calls which misdirect a potential attacker to improve the chances of running the script at least once in the event that a rogue process has successfully tampered with the script. Such a technique makes the web pages less likely to succumb to malware while not sacrificing normal operation.

Figure 1:
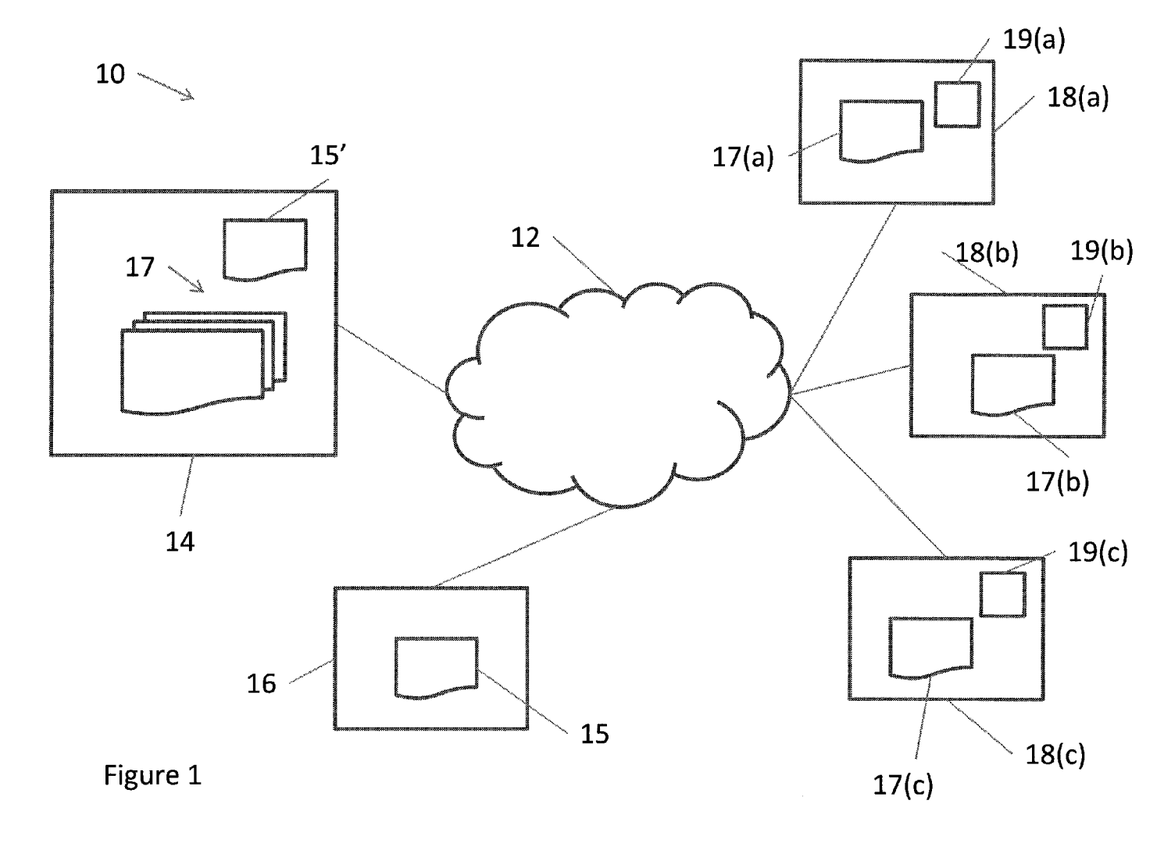
FIG. 1 is a block diagram of an electronic environment which is constructed and arranged to provide computer code to a set of client computers.

FIG. 1 shows an electronic environment 10 which is suitable for use by the improved technique. Electronic environment includes a communication medium 12, institutional server 14 and client computers 18(a), 18(b) and 18(c). Electronic environment 10 may further include an intermediary server 16.

Communication medium 12 provides connections between client computers 18 and institutional server 14. Communication medium 12 includes a public network, for example, the Internet.

Each client computer 18, e.g., from client computers 18(a), 18(b), 18(c), runs an Internet browser capable of rendering instructions written in HTML, XML, etc. into a web page viewable within the browser by a user at client computer 18(a). Further, each Internet browser includes an interpreter 19(a), 19(b), 19(c) [i.e., interpreter 19] configured to interpret Javascript code. The Javascript code is embedded in a file 17(a) called a script and upon interpretation by the interpreter 19(a) is used to form the basis of applications which run within the Internet browser. For example, a typical Javascript application from a bank may scan the client computer 18(a) for evidence of a type of malware known as a Trojan horse and, if such evidence is located, report the finding back to a server.

Institutional server 14 is constructed and arranged to provide a website through which client computers 18 can conduct electronic transactions. In some arrangements, institutional server 14 is also configured to generate a set of files 17 containing scripts from a master file 15. Upon request, the website delivers web pages containing, e.g., HTML code to client computers 18. A web page contains a link to a file 17 in the set of files 17 containing a script on institutional server 14 which sends a request to institutional server 14 to send the file.

Each file 17 includes an obfuscated script from a set of obfuscated scripts. Each obfuscated script includes code constructed and arranged to perform a particular function on client computers 18, the particular function of each obfuscated script performed on client computers 18 configured to be functionally equivalent as interpreted by each Internet browser.

In a situation where there is a large number of client computers 14 sending requests to institutional server 14, the load on institutional server 14 may become too large for institutional server 14 to handle the functions of hosting a web application, processing transactions, and obfuscating scripts.

In some arrangements, obfuscated script generation is off-loaded to intermediary server 16. That is, intermediary server 16 generates the set of files 17 from a master file 15. An advantage of having intermediary server 16 generate set of files 17 is that, unlike institutional server 14, the processing power of intermediary server 16 can be dedicated to the generation of the set of files 17. The processing power of institutional server 14, on the other hand, can be focused on processing transactions. Further, the generation of the set of files 17 on a server separate from institutional server 14 adds a layer of security to the electronic transactions.

In the description below, it will be assumed that the set of files 17 is generated from master file 15 on intermediary server 16. It will further be assumed that requests for web pages will be sent from client computer 18 to intermediary server 16, which will relay the request to institutional server 14.

During operation, intermediary server 16 generates, from master file 15, a set of files 17 containing obfuscated scripts, each of which has a different code structure and naming convention and yet provides the same functionality as in master file 15 in conjunction with a web page from institutional server 14. When intermediary server 16 receives a request from a client computer, say, 18(a) for a web page, intermediary server 16 sends a file, say 17(a), from the set of files 17. When intermediary server 16 receives a second request from client computer 18(a) for a web page, intermediary server 16 sends file 17(b) from the set of files 17, file 17(b) containing a differently obfuscated script than in file 17(a).

Figure 2:
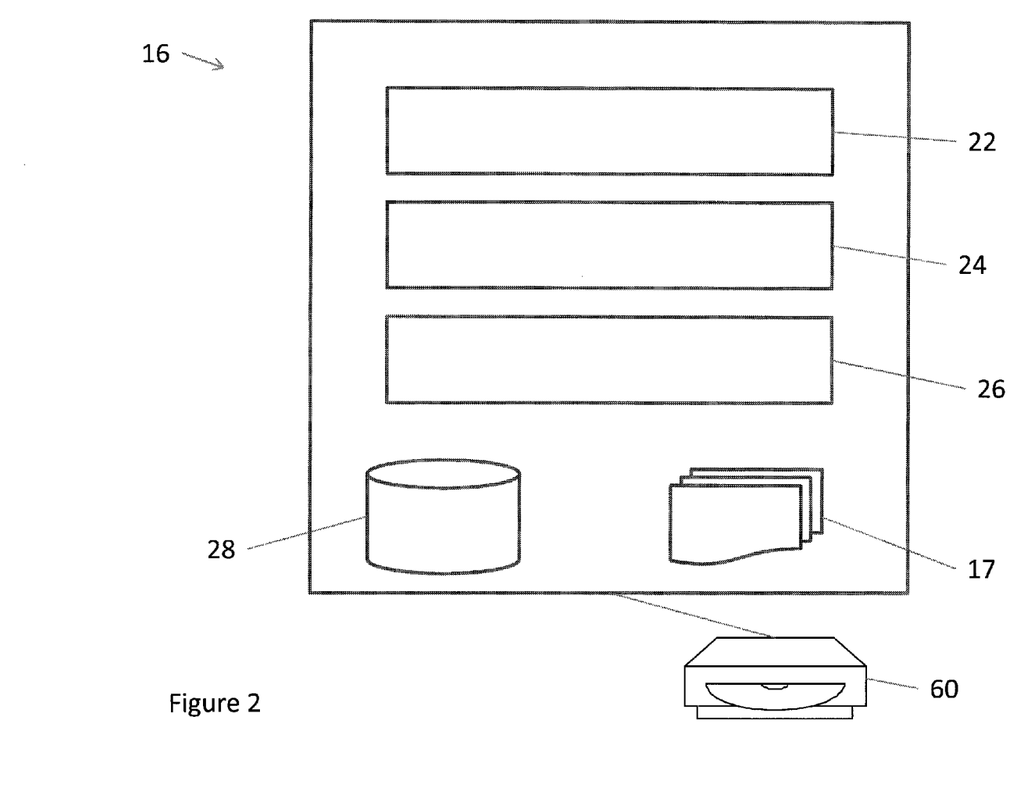
FIG. 2 is a block diagram showing particular details of a server with then electronic environment of FIG. 1, the server configured to generate the scripts containing computer code, the scripts to be provided to the set of client computers.

FIG. 2 shows further detail of the intermediary server 16. Intermediary server 16 includes a processor 22, memory 24 and network interface 26. Intermediary server 16 may further include a storage medium 28.

Memory 24 is configured to store a computer program which is constructed and arranged to produce obfuscated scripts 17 from master file 15.

Processor 22 can take the form of, but is not limited to, an Intel or AMD-based MPU, and can be a single or multi-core running single or multiple threads. Processor 22 is coupled to memory 24 and is configured to execute the computer program stored in memory 24.

Network interface 26 is configured to receive requests for a script from client computers 18 and send requests to processor 22. Network interface 26 is further configured to distribute files 17 containing scripts to client computers 18 over communications medium 12.

Storage medium 28 stores files 17 containing scripts generated by processor 22 at least until files 17 containing scripts are ready to be sent to client computers 18. Storage medium is preferably located with intermediary server 16 but can be located in a remote location and connected to intermediary server 16 over, e.g., communications medium 12.

Some results of a script obfuscation process carried out within electronic environment 10 will be illustrated by way of example below.

Figure 3A:
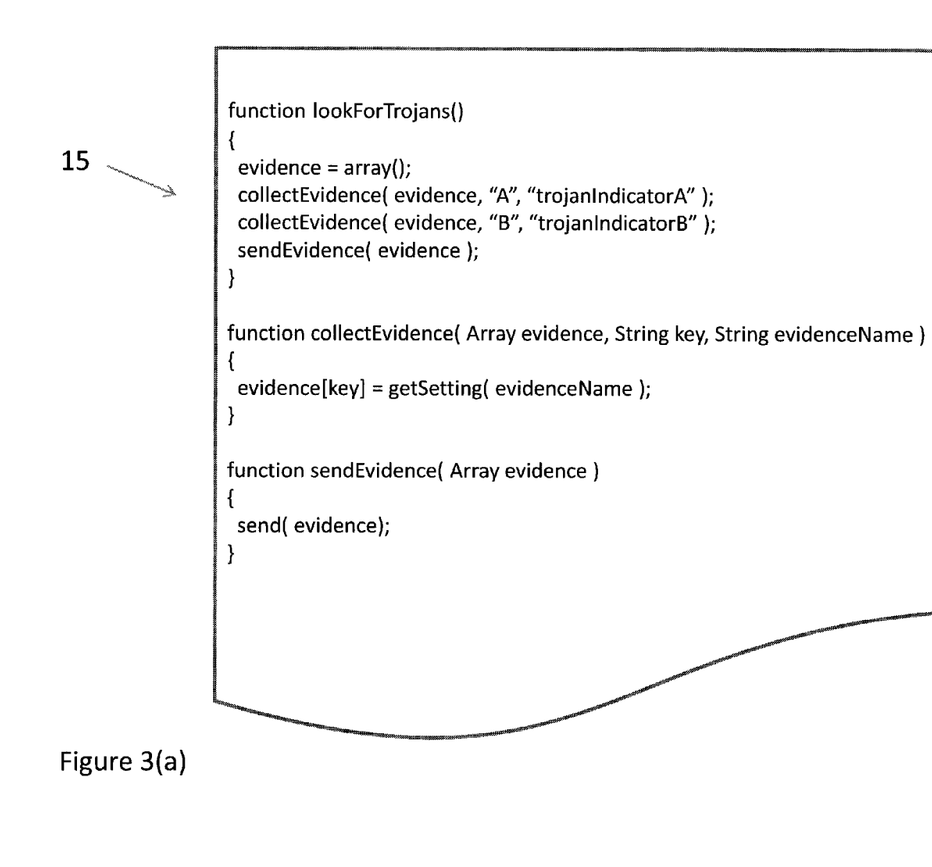
FIG. 3(a) is a block diagram of a file including a script containing code for a function lookForTrojans( ).

FIG. 3(a) shows a master file 15 containing a possible script for the function lookForTrojans( ). The purpose of the script in master file 15 is to collect evidence of Trojan malware on a client computer 18(a) and report the evidence back to institutional server 14. The script further contains auxiliary functions collectEvidence( ) and sendEvidence( ) which use commands to carry out their functions. The script also contains variables having names such as evidence. Master file 15 is preferably written in Javascript and uses standard Javascript commands in the function definitions.

At least one copy of master file 15 is stored on institutional server 14 and at least another copy of master file 15 is sent to intermediary server 16 for further processing.

During operation, processor 22 creates new files 15' and 17 [see FIGS. 3(b), 3(c) and 3(d) below] in which obfuscated scripts containing alternative definitions for the function lookForTrojans( ) is to be written. These alternative definitions for the function lookForTrojans( ) have different names for the auxiliary functions and variables from those in the definition of the function lookForTrojans( ) in master file 15. The obfuscated scripts in the files 15' and 17, however, are constructed and arranged to provide the same functionality as the script in the master file 15 when run on client computers 18. Upon receiving a request for a script from a client computer 18(a) via network interface 26, processor 22 sends, say, file 17(a) containing a first obfuscated script. Upon receiving a request for a script from a client computer 18(b) via network interface 26, processor 22 sends file 17(b) containing a second obfuscated script having a different set of function and variable names in the function definition than that in the first obfuscated script in file 17(a).

It should be understood that there are other ways of obfuscating a script than by changing names of functions and variables. For example, additional auxiliary functions can be added to a script which provides no change in functionality on the client computers 18.

Figure 3B:
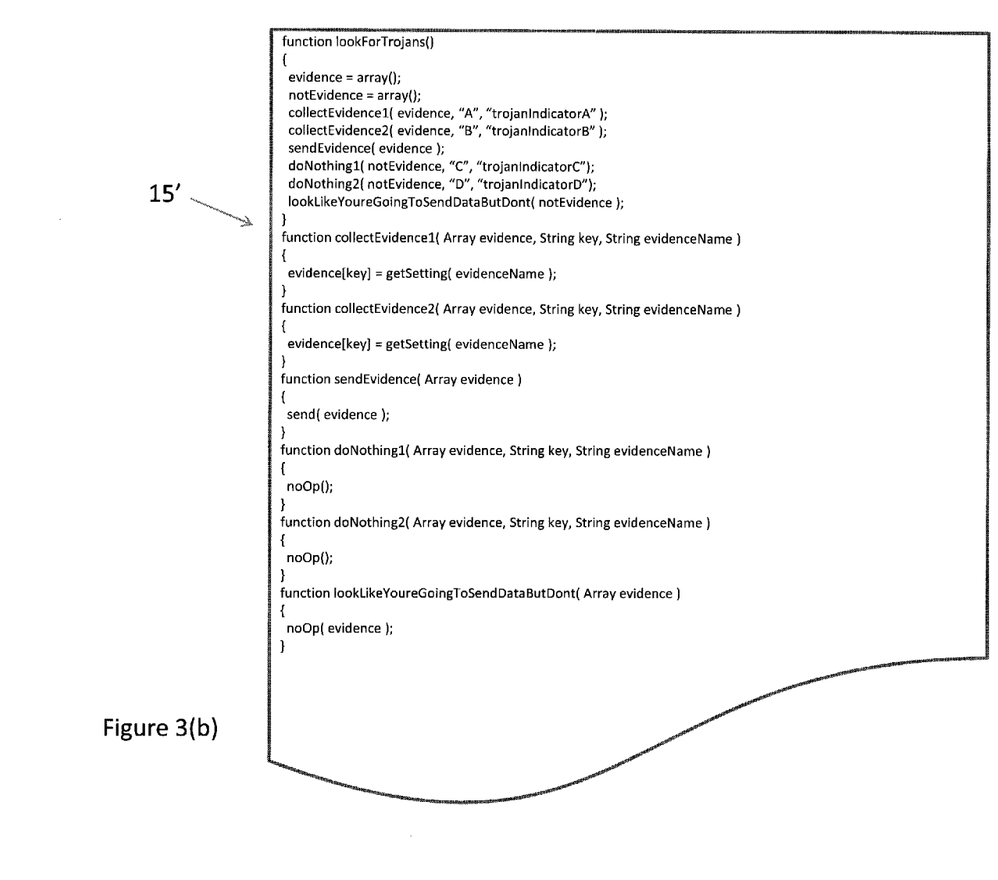
FIG. 3(b) is a block diagram of a file including a different script containing code for the function lookForTrojans( ) the function lookForTrojans( ) in the different script having the same functionality as the function lookForTrojans( ) in the script of FIG. 3(a).

FIG. 3(b) shows a script in an alternative master file 15' which contains references to functions named doNothing( ). A call to the function doNothing( ) results in no operation being executed on client computers 18. Nevertheless, several calls named doNothing1( ), doNothing2( ), etc., change the structure of the code within the obfuscated script without changing its functionality. Furthermore, as shown below, the names of the functions doNothing1( ), doNothing2( ), etc., can themselves be obfuscated with alternative names to hide their lack of functionality from a rouge process.

Figure 3C:
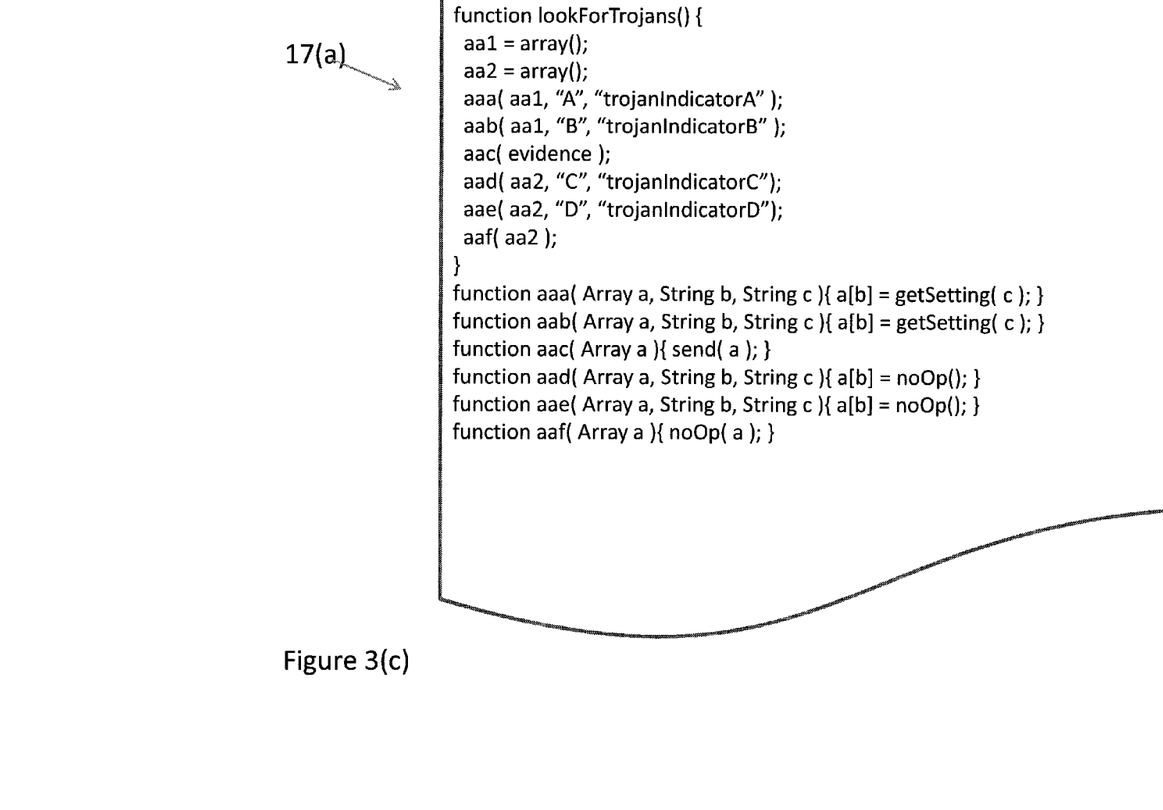
FIG. 3(c) is a block diagram of a file including a first obfuscated script based on the code for the function lookForTrojans( ) from the script of FIG. 3(b).
Figure 3D:
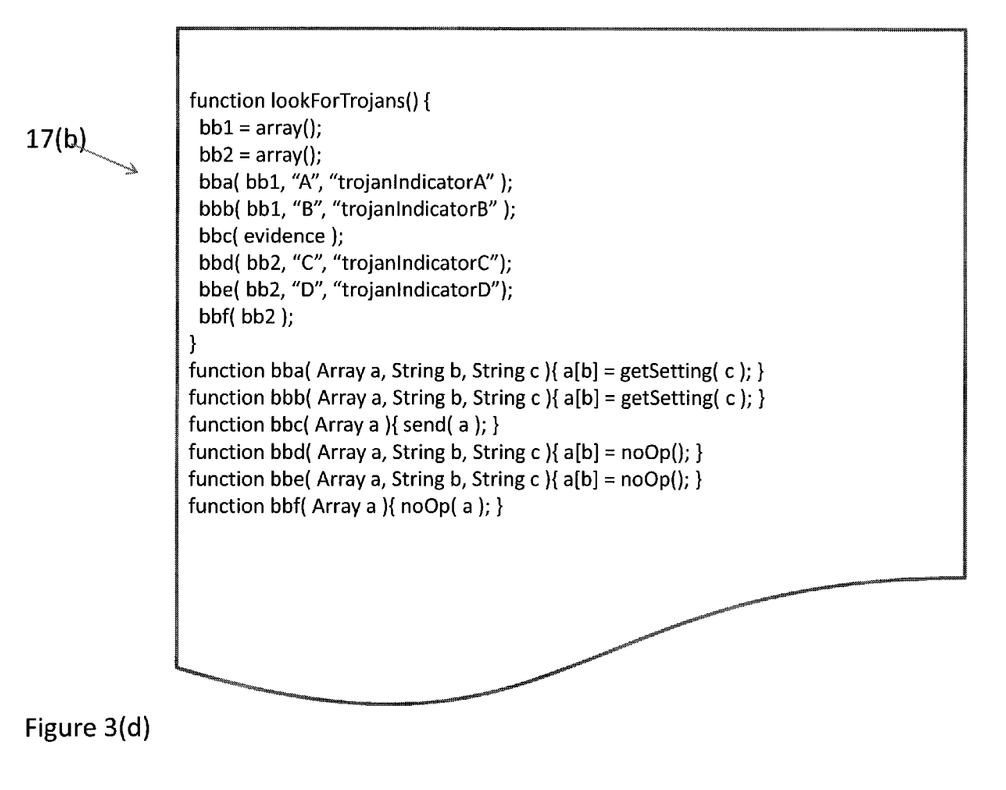
FIG. 3(d) is a block diagram of a file including a second obfuscated script based on the code for the function lookForTrojans( ) from the script of FIG. 3(b).

FIGS. 3(c) and 3(d) show scripts in a first obfuscated file 17(a) and a second obfuscated file 17(b). Files 17(a) and 17(b) are to be sent to client computers 18(a) and 18(b), respectively, upon processor 22 receiving requests for the scripts from client computers 18(a) and 18(b). In each of the scripts in files 17(a) and 17(b), all auxiliary function names, whether or not they contribute to the functionality of the overall script, have been changed into different names. Furthermore, although the scripts in files 17(a) and 17(b) are different from a text standpoint, they perform the same operations upon execution in client computers 18(*a*) and 18(*b*).

It should be understood that there are potentially many client computers 18 connected to institutional server 14 through intermediary server 16 over communication medium 12. In principle, processor 22 generates a unique obfuscated script corresponding to the script in master file 15 for each client computer 18 upon receipt of a request from the client computer 18. In some arrangements, however, processor 22 generates a sequence of files 17, each containing an obfuscated script. From this sequence of files, processor 22 responds to each request in a round robin fashion. In other words, when processor 22 sends the last file in the sequence of files 17 stored on storage medium 28, the client computer 18 sending the next request will receive the first file in the sequence of files 17. After the last file 17 in the sequence of files has been sent to a client computer 18, the next request will result in the first file in the sequence of files 17 being sent, and so on.

In other arrangements, processor 22 can generate obfuscated scripts in reaction to results from a detection of a rouge process on a client computer, say 18(*a*). For example, client computer, upon executing a script constructed and arranged to detect rogue processes and report them to the server, reports on the existence of a rogue process attempting to modify the script. Processor 22 can, upon receiving and examining such a report, automatically generate a new obfuscated script to be sent to client computer 18(*a*). The new obfuscated script would have different function and variable names and a different code structure than that in the current script in file 17(*a*).

In still other arrangements, processor 22 can generate the sequence of files 17 using a token value based on a seed value stored in storage medium 28. An example of a token is a 32-bit string whose value changes after a fixed time interval, say one minute. The value of the token depends on the seed value and a token generating function stored in memory 24. Based on the value of the token, processor 22 generates a new obfuscated script in a new file to be located within the sequence of files 17 stored on storage medium 28. The generating of a complete new sequence of files to replace an old sequence can be performed after a fixed time interval, say one week.

Figure 4:
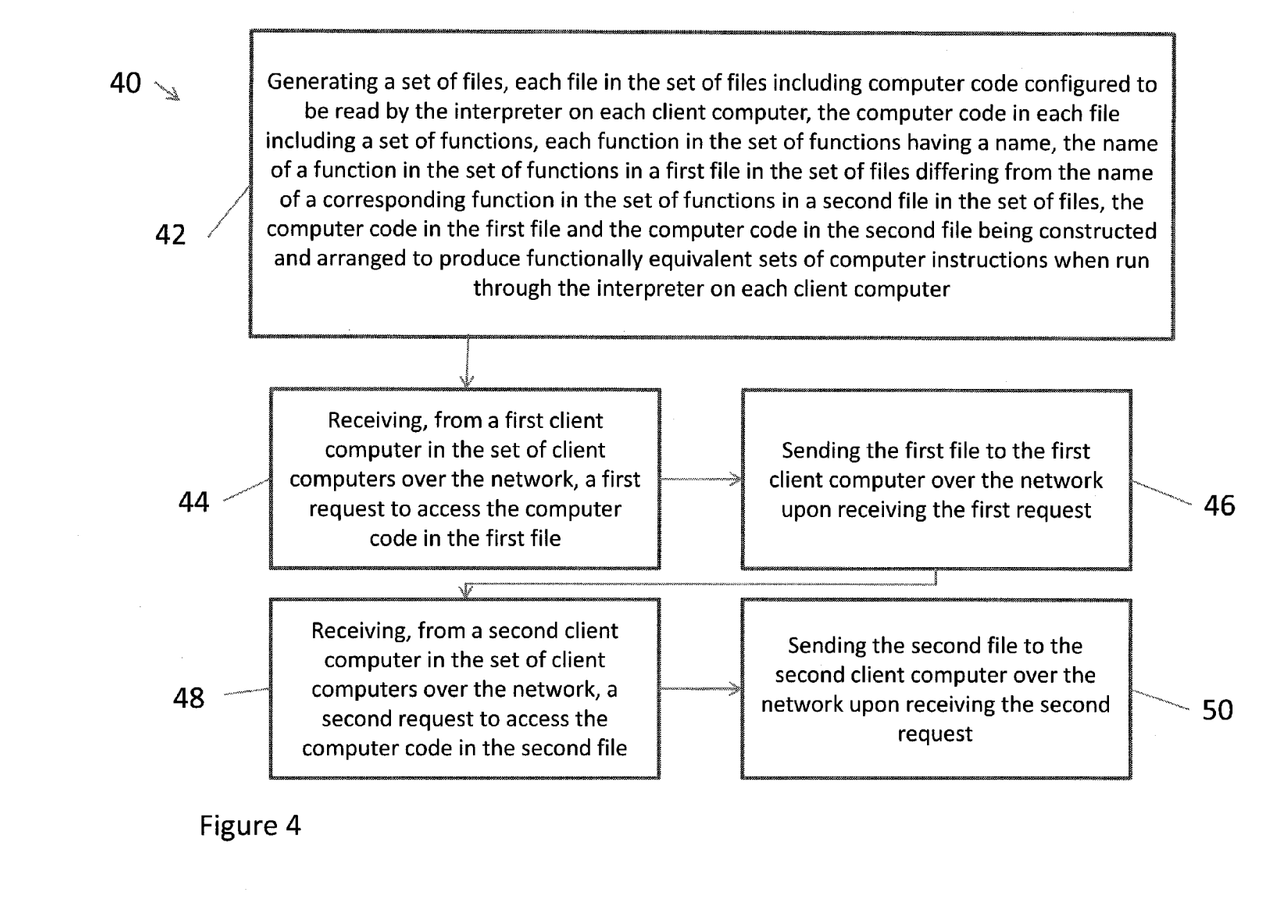
FIG. 4 is a flowchart of a method performed by a system within the electronic environment of FIG. 1.

FIG. 4 shows a method 40 of providing computer code to a set of client computers. In step 42 a set of files is generated, each file in the set of files including computer code configured to be read by the interpreters 19 on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreters 19 on each client computer. In step 44, a first request to access the computer code in the first file is received from a first client computer in the set of client computers over a network. In step 46, the first file is sent to the first client computer over the network upon receiving the first request. In step 48, a second request to access the computer code in the second file is received from a second client computer in the set of client computers over the network. In step 50, the second file is sent to the second client computer over the network upon receiving the second request.

The generation of the files in step 42 can be carried out by an intermediary server in communication with the institutional server. The intermediary server has a storage medium into which sequences of files each containing a generated obfuscated script is stored. The sequences of files can be sent to the client computers in a round robin fashion and regenerated after a fixed time interval.

While various embodiments of the invention have been particularly shown and described, it will be understood by those skilled in the art that various changes in form and details may be made therein without departing from the spirit and scope of the invention as defined by the appended claims.

For example, it should be understood that other scripting languages can be used in the improved technique described above. Examples of other scripting languages include, but are not limited to, Flash and Silverlight.

Also, it should be understood that parameter names passed in function calls and sent to a server [e.g., intermediary 16 or institutional 18] from a client computer 14 can be obfuscated. For example, in FIG. 3(*b*) the parameter "trojanIndicatorC" can be obfuscated. Such an obfuscation differs in nature from the code obfuscation described previously as parameter obfuscation requires a translation dataset on the server [say, 16] to translate the obfuscated parameter names back to usable parameter. Nevertheless, obfuscating parameter names further lowers risk of a malware attack as malware which processes, say, HTTP code will not be able to send valid data to the server 16.

Further, it should be understood that some embodiments are directed to an electronic environment which utilizes server 16 which provides computer code to a set of client computers. Some embodiments are directed to server 16. Some embodiments are directed to a process of providing, on a computer having a processor, computer code to a set of client computers. Also, some embodiments are directed to a computer program product which enables computer logic to perform the providing of computer code to a set of client computers on a computer having a processor.

In some arrangements, server 16 is implemented by a set of processors or other types of control/processing circuitry running software. In such arrangements, the software instructions can be delivered to server 16 in the form of a computer program product (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of providing computer code to a set of client computers, each client computer in the set of client computers having an interpreter capable of producing a set of computer instructions from the computer code, the method comprising:

generating, by a server connected to each client computer over a network, a set of files, each file in the set of files including computer code configured to be read by the interpreter on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreter on each client computer;

receiving, by the server and from a first client computer in the set of client computers over the network, a first request to access the computer code in the first file;

sending, by the server, the first file to the first client computer over the network upon receiving the first request;

receiving, by the server and from a second client computer in the set of client computers over the network, a second request to access the computer code in the second file;

sending, by the server, the second file to the second client computer over the network upon receiving the second request;

wherein the interpreter is part of a web browser on each client computer; and wherein receiving includes receiving a request through a website loaded onto memory on a client computer, the request originating in response to input-driven events on the client computer;

wherein the functionally equivalent sets of computer instructions are configured to report the existence of malware on each client computer to the server; and wherein sending the second file to the second client computer includes:

examining a report on the existence of malware on the second client computer; and if malware is found on the second client computer, checking, prior to sending the second file, the content of the second file to ensure there are predetermined differences between the computer code in the second file and the computer code in the first file, wherein the server, the first client computer and the second client computer are distinct.

2. A method as in claim 1, wherein generating further includes having each file in the set of files further include a set of variables, each variable in the set of variables having a name, the name of a variable in the set of variables in a first file in the set of files differing from the name of a corresponding variable in the set of variables in a second file in the set of files, the computer code in the first file and the computer code in the second file being constructed and arranged to produce functionally equivalent sets of computer instructions when run through the interpreter on each client computer.

3. A method as in claim 2, wherein the set of files form a sequence of files; and wherein the method further comprises receiving an additional request from a client computer from the set of client computers and, in response to the additional request, sending in a round robin fashion the next file in the sequence of files to the client computer from which the additional request was received.

4. A method as in claim 3, wherein generating further includes inserting, in the second file, additional computer code containing variables from the set of variables and functions from the set of functions, the computer code in the first file and the computer code in the second file being constructed and arranged to produce functionally equivalent sets of computer instructions when run through the interpreter on each client computer.

5. A method as in claim 4, wherein generating further includes inserting, in the second file, additional computer code containing variables from another set of variables different from the set of variables and functions from another set of functions different from the set of functions, the computer code in the first file and the computer code in the second file being constructed and arranged to produce functionally equivalent sets of computer instructions when run through the interpreter on each client computer.

6. A method as in claim 1, wherein the server is an institutional server which is in communication with an intermediary server and contains a master file containing computer code;

wherein generating further includes:

sending the master file to the intermediary server; and generating the set of files on the intermediary server;

wherein sending further includes sending, from the intermediary server, a file from the set of files to the institutional server upon the institutional server receiving a request for access to the computer code.

7. A method as in claim 6, wherein generating further includes generating a new set of files after a fixed time interval has elapsed since a previous set of files was generated.

8. A method as in claim 7, wherein generating further includes:

generating, by the intermediary server, a token value from a seed value stored on the intermediary server; and generating, based on the value of the token, a file to be included in the set of files.

9. A method as in claim 1, wherein the report on the existence of the malware on the second client computer includes a report on an existence of a rogue process attempting to modify the second file; and wherein the method further comprises:

automatically generating a new second file, the new second file having names of functions and variables and a structure of computer code that differ from the names of the functions and the variables and a structure of the computer code of the second file.

10. A method as in claim 1, wherein each function of the set of functions is configured to pass a set of parameters, each parameter of the set of parameters having a name, the name of a parameter the set of parameters passed by that function in a first file in the set of files differing from the name of a corresponding parameter of the set of parameters passed by that function; and wherein the method further comprises:

for each parameter passed by a function of the set of functions, translating the name of that parameter back to a usable parameter.

11. A system for providing computer code to a set of client computers, each client computer in the set of client computers having an interpreter capable of producing a set of computer instructions from the computer code, the system comprising a server, the server including:

a network interface coupled to a network;

a memory; and a processor coupled to the memory, the processor configured to:

generate a set of files, each file in the set of files including computer code configured to be read by the interpreter on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreter on each client computer;

receive from a first client computer a first request to access the computer code in the first file;

send the first file to the first client computer over the network upon receiving the first request;

receive from a second client computer a second request to access the computer code in the second file;

send the second file to the second client computer over the network upon receiving the second request;

wherein the interpreter is part of a web browser on each client computer; and wherein receiving includes receiving a request through a website loaded onto memory on a client computer, the request originating in response to input-driven events on the client computer;

wherein the functionally equivalent sets of computer instructions are configured to report the existence of malware on each client computer to the server; and wherein sending the second file to the second client computer includes:

examining a report on the existence of malware on the second client computer; and if malware is found on the second client computer, checking, prior to sending the second file, the content of the second file to ensure there are predetermined differences between the computer code in the second file and the computer code in the first file, wherein the server, the first client computer and the second client computer are distinct.

12. A system as in claim 11, wherein the server is an institutional server which is in communication with an intermediary server and contains a master file containing computer code;

wherein generating further includes:

sending the master file to the intermediary server; and generating the set of files on the intermediary server;

wherein sending further includes sending, from the intermediary server, a file from the set of files to the institutional server upon the institutional server receiving a request for access to the computer code.

13. A system as in claim 12, wherein generating further includes generating a new set of files after a fixed time interval has elapsed since a previous set of files was generated.

14. A system as in claim 13, wherein generating further includes:

generating a token value from a seed value stored on the intermediary server; and generating, based on the value of the token, a file to be included in the set of files.

15. A computer program product having a non-transitory computer readable storage medium which stores a server code to provide computer code to a set of client computers, each client computer in the set of client computers having an interpreter capable of producing a set of computer instructions from the computer code, the server code including a set of server instructions to:

generate a set of files, each file in the set of files including computer code configured to be read by the interpreter on each client computer, the computer code in each file including a set of functions, each function in the set of functions having a name, the name of a function in the set of functions in a first file in the set of files differing from the name of a corresponding function in the set of functions in a second file in the set of files, the computer code in the first file and the computer code in the second file being constructed and arranged to produce functionally equivalent sets of computer instructions when run through the interpreter on each client computer;

receive from a first client computer a first request to access the computer code in the first file;

send the first file to the first client computer over the network upon receiving the first request;

receive from a second client computer a second request to access the computer code in the second file;

send the second file to the second client computer over the network upon receiving the second request;

wherein the interpreter is part of a web browser on each client computer; and wherein receiving includes receiving a request through a website loaded onto memory on a client computer, the request originating in response to input-driven events on the client computer;

wherein the functionally equivalent sets of computer instructions are configured to report the existence of malware on each client computer to the server; and wherein sending the second file to the second client computer includes:

examining a report on the existence of malware on the second client computer; and if malware is found on the second client computer, checking, prior to sending the second file, the content of the second file to ensure there are predetermined differences between the computer code in the second file and the computer code in the first file, wherein the server, the first client computer and the second client computer are distinct.

16. A computer program product as in claim 15, wherein generating further includes having each file in the set of files further include a set of variables, each variable in the set of variables having a name, the name of a variable in the set of variables in a first file in the set of files differing from the name of a corresponding variable in the set of variables in a second file in the set of files, the computer code in the first file and the computer code in the second file being constructed and arranged to produce functionally equivalent sets of computer instructions when run through the interpreter on each client computer.

17. A computer program product as in claim 16, wherein the set of files form a sequence of files; and wherein the method further comprises receiving an additional request from a client computer from the set of client computers and, in response to the additional request, sending in a round robin fashion the next file in the sequence of files to the client computer from which the additional request was received.

18. A computer program product as in claim 17, wherein generating further includes inserting, in the second file, additional computer code containing variables from the set of variables and functions from the set of functions, the computer code in the first file and the computer code in the second file being constructed and arranged to produce functionally equivalent sets of computer instructions when run through the interpreter on each client computer.

* * * * *